United States Patent
Feldhauser et al.

[11] Patent Number: 5,616,531
[45] Date of Patent: Apr. 1, 1997

[54] NICKEL/SILICA CATALYST FOR HYDROTREATING UNSATURATED ORGANIC COMPOUNDS

[75] Inventors: Brigitte Feldhauser, Werl-Hilbeck; Wicher T. Koetsier, Emmerich, both of Germany; Cornelis M. Lok, Heswall, Wirrall, Great Britain

[73] Assignee: Unichema Chemie B.V., Gouda, Netherlands

[21] Appl. No.: 403,831

[22] PCT Filed: Sep. 2, 1993

[86] PCT No.: PCT/EP93/02385

§ 371 Date: Jun. 12, 1995

§ 102(e) Date: Jun. 12, 1995

[87] PCT Pub. No.: WO94/06557

PCT Pub. Date: Mar. 31, 1994

[30] Foreign Application Priority Data

Sep. 21, 1992 [EP] European Pat. Off. ............. 92202888

[51] Int. Cl.$^6$ .................................................. B01J 21/12
[52] U.S. Cl. .................... 502/253; 502/250; 502/240; 502/252; 502/329

[58] Field of Search ....................... 502/251, 252, 502/253, 234, 329, 250

[56] References Cited

FOREIGN PATENT DOCUMENTS

| 398668 | 11/1990 | European Pat. Off. . |
|---|---|---|
| 472918 | 3/1992 | European Pat. Off. . |
| 496448A1 | 7/1992 | European Pat. Off. . |
| 2198924 | 4/1974 | France . |
| 2210595 | 7/1974 | France . |
| 2525506 | 12/1976 | Germany . |

*Primary Examiner*—Janet C. Baxter
*Assistant Examiner*—Amy M. Harding
*Attorney, Agent, or Firm*—Cushman Darby & Cushman IP Group Pillsbury Madison & Sutro LLP

[57] ABSTRACT

A nickel/silica catalyst having a Ni/SiO$_2$ molar ratio of 10 to 2.5, preferably 6 to 3, contains zinc in an amount of at least 500 ppm (based on the nickel) and maximally in a molar ratio Zn/SiO$_2$ of 1. Additionally, the catalyst may comprise Mg in a molar ratio Mg/Ni of 0.05–0.15, max. (Mg+Zn)/SiO$_2$ molar ratio is 1. Also the catalyst may comprise Al in a molar ratio Al/Si of 0.05–0.5. Also methods of preparing the catalyst and its use for hydrogenating oils and fats have been described.

15 Claims, No Drawings

NICKEL/SILICA CATALYST FOR HYDROTREATING UNSATURATED ORGANIC COMPOUNDS

The invention relates to a nickel/silica catalyst having a molar ratio $Ni/SiO_2$ of 10 to 2.5 for hydrotreating unsaturated organic compounds, and to a method for the preparation of a nickel/silica catalyst having a molar ratio $Ni/SiO_2$ of 10 to 2.5 in which method a water insoluble nickel compound is precipitated from an aqueous solution containing a soluble nickel compound and combined with the supporting material, the resulting product being collected by filtration, washed, dried, and optionally calcined and reduced (activated). Commercial products containing the catalyst may be obtained by dispersing the reduced catalyst in fat or by extrusion or pelletizing a mixture of a calcined, or alternatively a reduced and passivated, catalyst and a binder. The invention further relates to a method for hydrogenating animal and vegetable fats and oils.

Nickel/silica catalysts having a molar ratio $Ni/SiO_2$ in the range of 10 to 2.5 for hydrotreating unsaturated organic compounds as such are known, for instance from the published European patent applications 0 145 094 and 0 167 201. The published patent applications disclose a method for the preparation of supported nickel catalysts, which catalysts optionally may comprise in addition to silica also alumina as a supporting material, in which method in a first step a water insoluble nickel compound is precipitated by combining an aqueous solution of a nickel compound with an aqueous solution of an alkaline precipitating agent, keeping the precipitate in suspension and adding in a following step an aqueous solution comprising a metal silicate e.g. sodium silicate and optionally a metal aluminate e.g. sodium aluminate to the suspension, optionally maturing the resulting precipitate in suspension, collecting the precipitate, drying the precipitate, washing the precipitate, optionally calcining the precipitate and subsequently reducing (activating) the precipitate.

Published European patent application 0 322 049 discloses that nickel/silica catalysts may contain an amount of a Group II metal in a molar ratio of X/Ni of 0.05 to 0.15. Group IIA metals, in particular magnesium and barium, are preferred. It is not disclosed in the patent application whether the presence of a Group II metal has a beneficial effect with regard to properties of the catalyst, such as activity and/or selectivity. From table I present in the European patent application it may however be deduced that the presence of magnesium results in an increase of the nickel surface area and, consequently, in an increase of the activity of the catalyst. It has been established in practice that magnesium contents resulting in a molar ratio Mg/Ni greater than 0.15 reduce the selectivity and the activity of these catalysts. With barium virtually only the pore volume of the catalyst seems to increase to some extent.

Although the methods disclosed in the patent applications referred to in the preceding paragraphs have certain advantages in comparison to other methods of preparation, nickel/silica catalysts may also be obtained by precipitating nickel and supporting material simultaneously from solution (coprecipitation method) or nickel may be precipitated on a supporting material present in suspension (impregnation method).

Surprisingly, it has now been found that zinc may decisively and effectively improve the quality of nickel/silica catalysts having a molar ratio $Ni/SiO_2$ of 10 to 2.5, in particular as to their activity and/or selectivity in the hydrogenation of unsaturated animal and vegetable fats and oils. The improvement caused by the presence of zinc has also been found with nickel/silica catalysts which in addition contain magnesium as a promotor.

A nickel/silica catalyst according to the invention is characterized in therefore that the catalyst contains at least a small but effective amount of zinc to improve the activity and/or selectivity of the catalyst in the hydrogenation of unsaturated animal and vegetable fats and oils.

A catalyst according to a preferred embodiment of the invention is characterized in that it contains zinc in an amount of at least 500 parts by weight per million parts of nickel and maximally in a molar ratio $Zn/SiO_2$ of 1. In the research leading to the invention it has been established that at amounts of 500 ppm of zinc usually an improvement of activity and/or selectivity of the catalyst in the hydrogenation of unsaturated animal and vegetable fats and oils will be found. The maximum molar amount of zinc should otherwise not be greater than the molar amount of $SiO_2$, because the presence of greater amounts possibly in the form of free ZnO in the catalyst will effectively diminish the activity of the catalyst. In case the catalyst contains magnesium as a promotor the molar ratio of $(Mg+Zn)/SiO_2$ should not be greater than 1.

In a preferred embodiment the molar ratio $Ni/SiO_2$ of the catalyst is in the range from 6 to 3.

An effective improvement is usually found with catalysts containing between 1000 and 100 000 parts by weight of zinc per million parts by weight of nickel (molar ratio Zn/Ni about 0.0009 to 0.09). With catalysts according to this embodiment in general a better selectivity combined with an acceptable or increased activity or an increased activity together with an acceptable or increased selectivity in the hydrogenation of unsaturated fats and oils is obtained compared to catalysts comprising zinc in an amount outside the preferred range but still within the broader range according to the invention. Nickel catalysts comprising an amount of zinc greater than the maximum amount which may be present as an impurity (maximally 200 ppm of Zn) but smaller than 1000 ppm in some cases did show some but usually small improvement as to activity and/or selectivity in tests used in the research leading to the invention. Technically useful results were usually found in the range of 1000 to 100 000 ppm of zinc. Increasing the amount of zinc to amounts greater than 100 000 ppm usually did not further improve the activity and/or selectivity of nickel catalysts in the hydrogenation of unsaturated fats and oils but may be useful in the hydrotreating of other organic materials.

A nickel/silica catalyst having a molar ratio $Ni/SiO_2$ of 10 to 2.5 and preferably in the range of 6 to 3, optionally comprising magnesium and/or, in addition to silica, alumina as a supporting material, according to the invention may be prepared by a method, in which a water insoluble nickel compound optionally, comprising magnesium, is precipitated from an aqueous solution and combined with a supporting material, the resulting product being collected by filtration, washed, dried, and optionally calcined and reduced (activated), which method is characterized in that a water insoluble compound comprising nickel and optionally magnesium is precipitated together with at least a small but effective amount of zinc to improve the activity and/or selectivity of the catalyst in the hydrogenation of animal and vegetable fats and oils. Most conveniently the insoluble nickel compound, comprising optionally magnesium is precipitated from an aqueous solution of a nickel compound containing in addition an adequate relative amount of a water soluble zinc compound and optionally a water soluble magnesium compound. In this method zinc is coprecipitated with nickel. It is, however, also possible to first precipitate an insoluble nickel compound from an aqueous solution and to add subsequently to a suspension of the insoluble nickel compound a solution of a zinc compound in a relative amount sufficient to precipitate an insoluble zinc compound in an effective amount to improve the activity and selectivity of the catalyst in the hydrogenation of animal and vegetable fats and oils.

In an alternative method for the preparation of a nickel/silica catalyst having a molar ratio $Ni/SiO_2$ of 10 to 2.5 and preferably in the range of 6 to 3, comprising optionally magnesium and/or in addition to silica also alumina as supporting material, for hydrotreating of organic compounds a water insoluble nickel compound is precipitated from an aqueous solution and combined with a supporting material comprising zinc in an amount such that the resulting catalyst comprises a small but effective amount of zinc to improve the activity and/or selectivity of the catalyst in the hydrogenation of animal and vegetable fats and oils.

In practice it has turned out that catalysts according to the invention may be obtained by precipitating the zinc containing insoluble nickel compound from a solution of a nickel compound comprising at least 500 parts by weight of zinc in the form of a water soluble zinc compound per million parts by weight of nickel in the form of a water soluble nickel compound. In a preferred embodiment the nickel solution comprises 1000 to 100 000 ppm of zinc relative to nickel in the form of a soluble zinc compound.

In a method for the preparation of the catalysts according to the invention aqueous solutions containing 0.1 to 1.0 Mol. per liter of a soluble nickel compound such as e.g. nickel nitrate, nickel sulphate, nickel chloride or nickel formate or mixtures of such compounds may be used, the solution may further comprise a soluble magnesium compound in a molar ratio Mg/Ni of 0.05 to 0.15. Soluble zinc compounds such as e.g. zinc nitrate, zinc sulphate, zinc chloride and zinc acetate or mixtures of such compounds may be added to the nickel solution in an amount of at least 0.00045 Mol. per Mol. of nickel compound or in a preferred embodiment of the invention in an amount 0.0009 to 0.09 Mol. per Mol. of nickel compound. Alkaline precipitating agents which may be used in the method for preparing the catalysts according to the invention are in particular alkali metal hydroxides, alkali metal carbonates and alkali metal bicarbonates, such as e.g. sodium hydroxide, sodium carbonate and sodium bicarbonate, also mixtures of such compounds may be used. Aqueous solutions containing between 0.1 and 1.5 Mol. per liter of an alkali metal compound are quite adequate in the present method. The alkaline precipitating solution should be combined with the solution comprising nickel and zinc and optionally magnesium ions in an equivalent ratio (alkali metal/Ni) of about 1.5. The solutions can be combined with each other continuously or discontinuously. Preferably the pH of the combined solution should be between 8.0 and 10.0, the temperature should preferably be kept between 0° and 70° C. The insoluble nickel/zinc compound is kept in suspension by stirring the suspension or by any other adequate mechanical agitation method. The suspension may be matured for some time if desired. In a following step an aqueous solution of a support precursor material such as a metal silicate is added to the suspension, the metal silicate solution may optionally also comprise a water soluble metal aluminate. Suitable silicates and aluminates are for example the water soluble silicates and aluminates of sodium. Aqueous solutions comprising 0.1 to 0.2 Mol. per liter of metal silicate, optionally together with metal aluminate per liter can be used. The solution should be added to the suspension in an amount sufficient to procure a molar ratio Ni/Si of between about 10 and 2.5 and in a preferred embodiment in the range of 6 to 3. The resulting precipitate is collected, optionally after maturing in suspension. The precipitate is washed e.g. with water, dried, optionally calcined in an oxygen atmosphere and reduced (activated) in an hydrogen atmosphere as known in the art e.g. as disclosed in the European patent applications referred to above. The catalyst may then be dispersed in fat, pelletized or extruded as known in the art.

Catalysts which in addition to the silica supporting material comprise alumina as a supporting material may be obtained by replacing part of the soluble metal silicate added to the suspension of the insoluble nickel/zinc compound by an equivalent molar amount of a water soluble metal aluminate such as an alkali metal aluminate e.g. sodium aluminate. The molar ratio Al/Si could amount to e.g. 0.05 to 0.5.

Catalysts according to the invention can be used in the hydrogenation of unsaturated animal and vegetable edible and nonedible fats and oils.

The invention will now be explained in greater detail with

The invention will now be explained in greater detail with reference to the following examples.

Examples 1 and 2 relate to the preparation of catalysts not according to the invention. Examples 3 to 10 relate to the preparation of catalysts according to the invention.

EXAMPLE 1

Preparation of a nickel/silica catalyst comprising up to 200 ppm of zinc (resulting from the amount of zinc present as an impurity in commercially available nickel sulphate used as a starting material in the preparation of the catalyst).

An aqueous solution containing 0.6 Mol. nickel sulphate and 0.066 Mol. magnesium sulphate per liter and an aqueous solution containing 0.9 Mol. sodium carbonate per liter were fed at equal and constant flow rates into a first continuous flow reactor at a rate that the residence time of the combined solutions in the reactor is only 30 seconds. The reactor is kept at room temperature and its contents are vigorously stirred with a turbine impeller (energy dissipation $\approx 25$ kW per $m^3$ of liquid in the reactor). The pH of the combined solutions is about 9.3.

The flow leaving the first reactor is fed into a second reactor which is kept at a temperature of between 99° and 99.5° C. The second reactor is also a continuous flow reactor and its contents are stirred using a turbine impeller (energy dissipation 2 to 4 $kW/m^3$ reactor volume). The residence time in the second reactor is 30 minutes. An aqueous solution containing 0.15 Mol. per liter of sodium silicate is fed into the second reactor at a rate which is sufficient to maintain the molar ratio of silica to nickel in the second reactor at 0.25±0.03.

The flow leaving the second reactor is fed into a storage tank of the same size as the second reactor. The stirring conditions and the residence time are the same as in the second reactor, but the contents of the storage tank are kept at a temperature of 70° C. only. The resulting slurry was filtered on a conventional filter and washed with deionized water of a temperature of 70° C. The washed filter cake is spray—dried, and subsequently reduced in a hydrogen atmosphere at 430° C. to yield the active catalyst. The chemical composition of the washed and spray—dried product was determined by inductive coupled plasma atomic emission spectra (see table 1).

The present catalyst comprises magnesium in a molar ratio Mg/Ni of 0.11. This catalyst possesses an optimum activity and selectivity compared to catalysts made in the same way but comprising significantly greater or smaller amounts of magnesium and zinc if any, in the form of a not intentionally added impurity (<200 ppm Zn) resulting from zinc present in the starting materials as an impurity.

EXAMPLE 2

Preparation of a nickel/silica catalyst comprising up to 200 ppm of zinc.

A catalyst was prepared according to the procedure as set forth in example 1, however, in stead of an aqueous solution containing only sodium carbonate an aqueous solution containing 0.825 Mol. sodium carbonate and 0.15 Mol. sodium hydroxide per liter was fed into the first reactor.

EXAMPLE 3

Preparation of a nickel/silica catalyst comprising 2000 parts by weight of zinc per million parts by weight of nickel.

A catalyst was prepared according to the procedure as set forth in example 2, however, in stead of an aqueous solution only containing nickel sulphate and magnesium sulphate, an aqueous solution containing 0.6 Mol. nickel sulphate, 0.066 Mol. magnesium sulphate and 0.0011 Mol. zinc sulphate per liter was fed into the first reactor.

EXAMPLE 4

Preparation of a nickel/silica catalyst comprising 5000 parts by weight of zinc per million parts of nickel.

A catalyst was prepared according to the procedure as set forth in example 1, however, in stead of an aqueous solution only containing nickel sulphate and magnesium sulphate, an aqueous solution containing 0.6 Mol. nickel sulphate, 0.066 Mol. magnesium sulphate and 0.0028 Mol. zinc sulphate per liter was fed into the first reactor.

EXAMPLE 6

Preparation of a nickel/silica catalyst comprising 10 000 parts by weight of zinc per million parts by weight of nickel.

A catalyst was prepared according to the procedure as set forth in example 5, however, the amount of zinc sulphate was 0.0056 Mol. per liter.

EXAMPLE 7

Preparation of a nickel/silica catalyst comprising 50 000 parts by weight of zinc per million parts of nickel.

A catalyst was prepared according to the procedure as set forth in example 5, however, the amount of zinc sulphate was 0.028 Mol. per liter.

EXAMPLE 8

Preparation of a catalyst comprising 100 000 parts by weight of zinc per million parts of nickel.

A catalyst was prepared according to example 5, however the amount of zinc sulphate was 0.056 Mol. per liter.

EXAMPLE 9

Preparation of a nickel/silica catalyst comprising 5000 parts by weight of zinc per million parts of nickel and magnesium in a molar ratio Mg/Ni of 0.14.

A catalyst was prepared according to the procedure as set forth in example 2, however, in stead of an aqueous solution only containing nickel sulphate and magnesium sulphate, an aqueous solution containing 0.6 Mol. nickel sulphate, 0.084 Mol. magnesium sulphate and 0.028 Mol. zinc sulphate per liter was fed into the first reactor.

EXAMPLE 10

Preparation of a nickel/silica catalyst comprising 5000 parts by weight of zinc per million parts-of nickel and magnesium in a molar ratio Mg/Ni of 0.07.

A catalyst was prepared according to the procedure as set forth in example 2, however, in stead of an aqueous solution only containing nickel sulphate and magnesium sulphate, an aqueous solution containing 0.6 Mol. nickel sulphate, 0.042 Mol. magnesium sulphate and 0.028 Mol. zinc sulphate per liter was fed into the first reactor.

The activity and selectivity of the catalysts obtained according to examples 1 to 10 were determined by using the following catalyst performance tests (Test Series A, B and C):

Description of Test Series A and B.

An amount of a neutralised, bleached fish oil with an iodine value (I.V.) of 168 was hydrogenated in the presence of a catalyst in a 400 ml dead-end autoclave (manufactured by MEDIMEX, Lengnau, Switserland) fitted with a Press Flow Control (manufactured by PETERIC Ltd, Surrey, Great Britain) for monitoring continuously hydrogen fed into the autoclave during hydrogenation, a stirrer, the stirring rate of which could be controlled, and a controllable heating device. The activity was measured in minutes hardening time to obtain an I.V. of 80. The melting point of the hydrogenated oil is an indication for the selectivity of the catalyst. The oil used in the tests had a sulphur content of maximally 7 ppm, a phosphorous content of maximally 2 ppm. The oil further contained maximally 0.03 wt % of water and 0.09 wt % of free fatty acids. The temperature of the oil during hydrogenation was kept at 150° C. till an I.V. of 120 was reached, then the temperature was increased to 180° C. The hydrogen pressure in the autoclave was kept at 4 bar by continuously feeding hydrogen into the autoclave during hydrogenation till an I.V. of 80 was obtained. Temperature and hydrogen pressure during hydrogenation as used in the tests are common in commercial hydrogenation operations. The change in I.V. during hydrogenation was continuously calculated from the amount of hydrogen absorbed by the oil. At the moment that based on this calculation an I.V. of 80 should have been reached, hydrogen supply and stirring were terminated and the autoclave was cooled to ambient temperature. Then samples of the hydrogenated oil were taken from the autoclave for ascertaining the I.V. of the oil to check whether the test had been carried out successfully and to determine the slip melting point as a measure for the selectivity of the catalyst. To allow a true comparison of the test results only the results of such tests will be shown in which indeed an I.V. of 80 had been obtained.

As the hardening time at a given activity of the catalyst and a given amount thereof not only depends on hydrogen pressure and temperature during hydrogenation, but also on stirring rate, first a standard stirring rate was determined necessary to arrive at an I.V. of 80 in a minimum hardening time of 52 minutes (Test Series A, low severity test) and in a minimum hardening time of 35 minutes (Test Series B, high severity test) with an amount of oil of 160 g and 200 g, respectively, and in the presence of so much of a nickel catalyst that the hardening time is independent of the activity of the catalyst in question, that is to say the hardening time applying the physical parameters: hydrogen pressure and temperature as indicated, does not decrease in the presence of a greater amount of catalyst in the oil used in the tests. The standard stirring rate established was 650 rpm and 720 rpm, respectively. In determining the standard stirring rate a commercially available silica supported nickel hydrogenation catalyst was used (PRICAT 9910, manufactured by UNICHEMA CHEMIE GmbH) in an amount of 6500 parts by weight of nickel per million parts of oil. From the preceding discussion it may however be clear, that any hydrogenation catalyst depending for its catalytic activity on the presence of nickel may be used in determining the standard stirring rate.

In the actual Test Series A and B using the catalysts according to the invention (physical parameters: hydrogen pressure 4 bar, temperature as indicated and at the standard stirring rate) so much of the catalyst was used that the hardening time was about 1½ to 2 times the minimum hardening time. In Test Series A: 650 ppm Ni and in Test Series B: 500 ppm Ni were present in the oil. A shorter hardening time is an indication for a greater activity of the catalyst in question.

The slip melting point was determined by measuring the temperature at which the oil flows out of a capillary at an applied pressure of 10 psi. The oil at this temperature is still a mixture of solids and liquid, but it has been sufficiently liquified to flow under the slight overpressure of 10 psi. The actual determination was carried out as follows:

A capillary with an inner diameter of 1 mm is filled with liquid oil and is cooled down in an aluminium block to $-12°$ C. and then the temperature is raised with 3° C./min. The top side of the capillary is connected to a polyethylene tube in which a slight overpressure of 10 psi is applied. At the moment the solid oil in the tube has reached a temperature at which it has been sufficiently liquified to move, the pressure in the tube changes and the pressure change is recorded, the temperature of the oil at this moment is defined as the slip melting point. A lower slip melting point obtained with a catalyst is an indication that the catalyst has a higher selectivity.

The activity and selectivity of the catalysts of example 1 to 8 are presented in table 1.

TABLE 1

| Ex. | $SiO_2$/Ni | Mg/Ni | Zn/Ni | Zn ppm | Test A A/min | Test A S/°C. | Test B A/min | Test B S/°C. |
|---|---|---|---|---|---|---|---|---|
| 1* | 0.26 | 0.11 | — | <200 | 88 | 35.4 | — | — |
| 2 | 0.29 | 0.11 | — | <200 | 71 | 34.0 | 77 | 35.1 |
| 3 | 0.26 | 0.11 | 0.0016 | $2 \cdot 10^3$ | 67 | 34.7 | — | — |
| 4 | 0.27 | 0.11 | 0.0045 | $5 \cdot 10^3$ | 76 | 32.5 | — | — |
| 5 | 0.27 | 0.11 | 0.0045 | $5 \cdot 10^3$ | 68 | 33.3 | — | — |
| 6 | 0.27 | 0.11 | 0.009 | $1 \cdot 10^4$ | 75 | 32.7 | 75 | 33.9 |
| 7 | 0.23 | 0.11 | 0.045 | $5 \cdot 10^4$ | 74 | 32.4 | — | — |
| 8 | 0.28 | 0.11 | 0.09 | $1 \cdot 10^5$ | 75 | 31.9 | — | — |

* precipitation with sodium carbonate/not marked with * precipitation with sodium carbonate/sodium hydroxide.

In table 2 results are shown of test B applied to a catalyst not according to the invention (ex. 2) and to a catalyst according to the invention (ex. 6) using smaller amounts of catalyst than 500 ppm of Ni. The figures in table 2 demonstrate that a catalyst according to the invention also if used in smaller amounts possesses a greater activity and selectivity than a catalyst not according to the invention.

TABLE 2

| ex. | ppm of Ni | Test B A/min | Test B S/°C. |
|---|---|---|---|
| 2 | 300 | 266 | 36.8 |
| <200 ppm | 400 | 135 | 36.3 |
| Zn | 500 | 77 | 35.1 |
| 6 | 300 | 200 | 36.0 |
| $1 \cdot 10^4$ ppm | 400 | 113 | 34.5 |
| Zn | 500 | 75 | 33.9 |

Description of Test Series C.

In this test 250 gr of a neutralised, bleached soybean oil with an I.V. of 132 was hydrogenated in the presence of a catalyst in a 500 ml open reactor fitted with a controllable heating device and a stirrer, the stirring rate of which could be varied. The oil used in the test had a phosphorous content of maximally 2 ppm. The oil further contained maximally 0.03 wt % of water and 0.09 wt % of free fatty acid. The temperature of the oil at the start of the hydrogenation was 150° C. During hydrogenation the temperature of the oil was increased 20° C. stepwise every 15 minutes and hydrogen was fed continuously at a rate of about 15 l per hour into the oil. The activity of the catalyst is expressed in minutes hardening time necessary to obtain an I.V. of 82. After 50 minutes, 55 minutes and 60 minutes of hydrogenation using a standard stirring rate samples were taken from the oil and the I.V. and slip melting point determined. By interpolation the hardening time and slip melting point at an I.V of 82 were determined.

The standard stirring rate was determined as described for Test Series A and B by determining the stirring rate necessary to arrive at an I.V. of 82 in a minimum hardening time of 45 minutes with 250 gr of the oil in question in the presence of 6500 ppm Ni (Pricat 9910). The standard stirring rate found was 750 rpm.

In the actual Test Series C using catalysts according to the invention (physical parameters: hydrogen pressure 1 bar absolute, temperature and temperature increase as indicated above and at the standard stirring rate) so much of the catalyst was used that the nickel content of the oil was 100 ppm.

The slip melting point was measured as described before. In table 3 results are given of the hardening time and slip melting point determination according to this test with catalysts according to example 2<200 ppm Zn), example 5 (500 ppm Zn) and example 8 (100 000 ppm Zn).

TABLE 3

| Ex. | ppm of Zn | A/min | S/°C. |
|---|---|---|---|
| 2 | <200 | 55 | 30.9 |
| 5 | $5 \cdot 10^3$ | 52 | 31.0 |
| 8 | $1 \cdot 10^{5\,5}$ | 62 | 31.0 |

The activity and selectivity of the catalysts of example 9 and 10 are shown in table 4

TABLE 4

| Ex. | $SiO_2$/Ni | Mg/Ni | Zn/Ni | Zn ppm | Test A A/min | Test A S/°C. | Test C A/min | Test C S/°C. |
|---|---|---|---|---|---|---|---|---|
| 9 | 0.27 | 0.14 | 0.0045 | $5 \cdot 10^3$ | 70 | 32.6 | 56 | 31.6 |
| 10 | 0.24 | 0.07 | 0.0045 | $5 \cdot 10^3$ | 73 | 32.7 | 61 | 31.1 |

We claim:

1. A nickel/silica catalyst having a molar ratio $Ni/SiO_2$ of 10 to 2.5 for hydrotreating unsaturated organic compounds, characterized in that the catalyst comprises zinc in an amount of at least 500 parts by weight per million parts of nickel and maximally in a molar ratio $Zn/SiO_2$ of 1.

2. A nickel/silica catalyst according to claim 1 in which the molar ratio $Ni/SiO_2$ is in the range of 6 to 3.

3. A catalyst according to claim 1, characterized in that the catalyst comprises between 1000 and 100,000 parts by weight of zinc per million parts of nickel.

4. A catalyst according to claim 1, characterized in that the catalyst comprises magnesium in a molar ratio $Mg/Ni$ of between 0.05 to 0.15 and that the molar ratio $(Mg+Zn)/SiO_2$ is maximally equal to 1.

5. A catalyst according to claim 1, characterized in that the catalyst comprises aluminium in a molar ratio $Al/Si$ of 0.05 to 0.5.

6. In a method for the catalytic hydrogenation of unsaturated animal and vegetable fats and oils, the improvement which comprises using, as the catalyst, a catalyst according to claim 1.

7. In a method for the preparation of a nickel/silica catalyst having a molar ratio $Ni/SiO_2$ of 10 to 2.5 for hydrotreating of organic compounds, in which method a water insoluble nickel compound optionally comprising magnesium is precipitated from an aqueous solution and combined with a silica or silica precursor supporting material, the resulting product being collected by filtration, washed, dried, and optionally calcined and reduced, the improvement wherein the water insoluble compound comprising nickel and optionally magnesium is precipitated together with zinc in an amount of at least 500 parts by weight per million parts of nickel and maximally in a molar ratio $Zn/SiO_2$ of 1.

8. A method according to claim 7, wherein the water insoluble nickel compound, optionally comprising magnesium is precipitated from an aqueous solution of a nickel compound containing in addition an adequate amount of a water soluble zinc compound and optionally a water soluble magnesium compound.

9. A method according to claim 8, wherein: (a) a water insoluble nickel compound comprising zinc in an amount of at least 500 ppm of zinc relative to nickel and maximally in a molar ratio $Zn/SiO_2$ of 1, and optionally comprising magnesium, is precipitated by combining an aqueous solution of a nickel compound containing a water soluble zinc compound in an adequate amount and optionally a water soluble magnesium compound with an aqueous solution of an alkaline precipitating agent, and (b) an aqueous solution comprising as support precursor material, a metal silicate and optionally a soluble metal aluminate is subsequently added to a suspension of the water insoluble nickel compound comprising zinc and optionally magnesium.

10. A method according to claim 8, wherein (a) a suspension of a water insoluble nickel compound optionally comprising magnesium is formed by combining an aqueous solution of a nickel compound and optionally a water soluble magnesium compound with an aqueous solution of an alkaline precipitating agent whereby said water insoluble nickel compound optionally comprising magnesium is precipitated, and (b) thereafter, there is added to said suspension an aqueous solution of a support precursor material comprising silicium, a water soluble zinc compound and optionally aluminium, said aqueous solution of support precursor material containing the zinc compound in an adequate amount to result in an amount sufficient to provide at least 500 parts by weight of zinc per million parts of nickel in the catalyst and maximally in a molar ratio $Zn/SiO_2$ of 1.

11. A method according to either 9 or claim 10, wherein the support precursor material is a water soluble sodium silicate, optionally comprising a water soluble sodium aluminate.

12. A method according to claim 7, wherein the insoluble nickel compound optionally comprising magnesium is combined with a silica containing supporting material in a molar ratio of $Ni/SiO_2$ in the range of 6 to 3.

13. A method for the preparation of a nickel/silica catalyst having a molar ratio $Ni/SiO_2$ of 10 to 2.5 for hydrotreating of organic compounds, in which method a water insoluble nickel compound, optionally comprising magnesium, is precipitated from an aqueous solution and combined with a silica or silica precursor supporting material, optionally comprising alumina, said aqueous solution comprising zinc in an amount of at least 500 parts by weight per million parts of nickel and maximally in a molar ratio $Zn/SiO_2$ of 1.

14. A method according to either claim 7, claim 8 or claim 13 wherein a catalyst is prepared comprising between 1000 and 100,000 parts by weight of zinc per million parts of nickel.

15. A method according to either claim 7, claim 8 or claim 13 wherein a catalyst is prepared comprising magnesium in a molar ratio $Mg/Ni$ of 0.05 to 0.15 and the molar ratio $(Mg+Zn)/SiO_2$ is maximally equal to 1.

* * * * *